US010282275B2

(12) United States Patent
Rivera et al.

(10) Patent No.: US 10,282,275 B2
(45) Date of Patent: May 7, 2019

(54) METHOD AND SYSTEM FOR MANAGING CODE

(71) Applicant: Microsoft Technology Licensing, LLC, Redmond, WA (US)

(72) Inventors: Carlo Rivera, Township of Washington, NJ (US); Derek Ying Kit Leung, Seattle, WA (US); Barrett E. Amos, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1 day.

(21) Appl. No.: 15/438,885

(22) Filed: Feb. 22, 2017

(65) Prior Publication Data

US 2018/0081784 A1 Mar. 22, 2018

Related U.S. Application Data

(60) Provisional application No. 62/398,444, filed on Sep. 22, 2016.

(51) Int. Cl.
*G06F 8/41* (2018.01)
*G06F 8/71* (2018.01)
(Continued)

(52) U.S. Cl.
CPC ............ *G06F 11/3624* (2013.01); *G06F 8/43* (2013.01); *G06F 8/71* (2013.01); *G06F 11/079* (2013.01);
(Continued)

(58) Field of Classification Search
CPC .......... G06F 8/71; G06F 8/70; G06F 11/3672; G06F 8/40–8/49; G06F 8/423–8/458;
(Continued)

(56) References Cited

U.S. PATENT DOCUMENTS 5,852,734 A 12/1998 Komatsu et al.
6,195,795 B1 2/2001 Block et al.
(Continued)

OTHER PUBLICATIONS

"Non Final Office Action Issued in U.S. Appl. No. 15/425,775", dated Jun. 14, 2018, 15 Pages. (Year: 2018).*
(Continued)

*Primary Examiner* — Emerson C Puente
*Assistant Examiner* — Erika Kretzmer
(74) *Attorney, Agent, or Firm* — Merchant & Gould

(57) ABSTRACT

Management of an extensive code database having multiple user tenants building code is provided. A request to check-in code is received, and a build and validation to check-in the update to a user's code is performed. The validation results in indication of an error due to a bad state of the system that performed the build. The build machine is rebooted, and a second build is performed. Optionally, a user is prompted during a grace time period to cancel the corrective action of rebooting the build machine. Optionally, the validation error may be indicated as a product issue, a network issue, or a known limitation in the compiler. Optionally, other corrective actions such as preventing retrying the build and escalating the error may be taken. Optionally, the build may be prevented when the check-in includes code that produced an error on a previous build.

19 Claims, 12 Drawing Sheets

(51) Int. Cl.
*G06F 11/07* (2006.01)
*G06F 11/14* (2006.01)
*G06F 11/36* (2006.01)

(52) U.S. Cl.
CPC ...... *G06F 11/1441* (2013.01); *G06F 11/0793* (2013.01); *G06F 11/36* (2013.01); *G06F 11/366* (2013.01)

(58) Field of Classification Search
CPC .. G06F 8/4432–8/4452; G06F 11/0703; G06F 11/0706; G06F 11/0709; G06F 11/0751; G06F 11/079; G06F 11/0793; G06F 11/0796; G06F 11/36; G06F 11/3624; G06F 11/14; G06F 11/1402; G06F 11/1415; G06F 11/1417; G06F 11/1438; G06F 11/1411
See application file for complete search history.

(56) References Cited

U.S. PATENT DOCUMENTS

| | | | |
|---|---|---|---|
| 6,460,055 B1 | 10/2002 | Midgley et al. | |
| 7,519,953 B2 | 4/2009 | Reissman et al. | |
| 7,568,183 B1 | 7/2009 | Hardy et al. | |
| 8,020,044 B2* | 9/2011 | Martinov | G06F 11/3688 714/25 |
| 8,312,430 B2* | 11/2012 | Best | G06F 8/71 717/120 |
| 8,365,140 B2* | 1/2013 | Heyhoe | G06F 8/71 717/101 |
| 8,713,554 B1 | 4/2014 | Chopra et al. | |
| 8,839,188 B2* | 9/2014 | Chen | G06F 8/71 717/100 |
| 8,972,937 B2 | 3/2015 | Gu | |
| 9,256,450 B2* | 2/2016 | Keating | G06F 9/455 |
| 2004/0015413 A1* | 1/2004 | Abu-Hejleh | G06Q 20/02 705/26.44 |
| 2004/0123280 A1 | 6/2004 | Doshi et al. | |
| 2005/0055518 A1 | 3/2005 | Hochberg et al. | |
| 2006/0229895 A1 | 10/2006 | Kodger, Jr. | |
| 2009/0164530 A1 | 6/2009 | Gilpin et al. | |
| 2009/0300580 A1* | 12/2009 | Heyhoe | G06F 8/71 717/106 |
| 2010/0058294 A1* | 3/2010 | Best | G06F 8/71 717/122 |
| 2010/0235611 A1 | 9/2010 | Yamashita | |
| 2011/0093744 A1* | 4/2011 | Martinov | G06F 11/3688 714/35 |
| 2011/0161929 A1* | 6/2011 | Keating | G06F 9/455 717/120 |
| 2011/0296386 A1* | 12/2011 | Woollen | G06F 8/70 717/124 |
| 2012/0297359 A1* | 11/2012 | Chen | G06F 8/71 717/104 |
| 2013/0152047 A1 | 6/2013 | Moorthi et al. | |
| 2015/0033202 A1 | 1/2015 | Wilson et al. | |
| 2015/0248280 A1 | 9/2015 | Pillay et al. | |
| 2016/0077927 A1 | 3/2016 | Bhargava et al. | |
| 2016/0342421 A1 | 11/2016 | Wilson et al. | |
| 2017/0010889 A1* | 1/2017 | Spektor | G06F 8/71 |
| 2018/0081784 A1* | 3/2018 | Rivera et al. | G06F 11/3624 |
| 2018/0150283 A1 | 5/2018 | Peterson et al. | |
| 2018/0150286 A1* | 5/2018 | Speirs et al. | G06F 8/452 |

OTHER PUBLICATIONS

"Notice of Allowance Issued in U.S. Appl. No. 15/425,834", dated Jun. 4, 2018, 16 Pages. (Year: 2018).*
"Notice of Allowance Issued in U.S. Appl. No. 15/425,834", dated Jun. 18, 2018, 2 Pages. (Year: 2018).*
Alistar, Elvis., "Leveraging Unity Cloud Build for Testing Large Projects", Published on: Jun. 26, 2015 Available at: http://blogs.unity3d.com/2015/06/26/leveraging-unity-cloud-build-for-testing-large-projects/.
"Understanding the Bamboo CI Server", Published on: Sep. 10, 2015 Available at: https://confluence.atlassian.com/bamboo/understanding-the-bamboo-ci-server-289277285.html.
"Buildbot", Retrieved on: Jun. 7, 2016 Available at: http://buildbot.net/#/basics.
Ritchie, Stephen, "TeamCity vs Jenkins: Which is the Better Continuous Integration (CI) Server for .NET Software Development?", Published on: Nov. 20, 2012 Available at: https://www.excella.com/insights/teamcity-vs-jenkins-better-continuous-integration-server.
"Lava", Published on: May 27, 2016 Available at: http://www.linaro.org/initiatives/lava/.
Horrik, Geert Van, "Automatic builds via FinalBuilder and Continua CI", Published on: Sep. 1, 2013 Available at: http://geertvanhorrik.com/2013/09/01/automatic-builds-via-finalbuilder-and-continua-ci/.
"Jenkins—Automated Testing", Published on: Dec. 6, 2015 Available at: http://www.tutorialspoint.com/jenkins/jenkins_automated_testing.htm.
"Jenkins", Retrieved on: Jun. 14, 2016 Available at: https://jenkins.io/.
"Final Office Action Issued in U.S. Appl. No. 15/425,775", dated Nov. 6, 2018, 23 pages.

* cited by examiner

MOBILE COMPUTING DEVICE

METHOD AND SYSTEM FOR MANAGING CODE

RELATED APPLICATION

This application claims benefit of U.S. Provisional Patent Application No. 62/398,444 titled "BUILD AND TEST VALIDATION SCHEDULING SYSTEM" filed on Sep. 22, 2016, the entirety of which is hereby incorporated by reference.

BACKGROUND

When developing a software product, the code base for the product can be extensive. As such, building, testing, and validating a product can be very time-consuming and challenging. In a system where success depends on all the moving pieces being healthy, the probability of success decreases exponentially with the number of pieces, which is a common characteristic in monolithic engineering systems. Previous solutions generally rely on manual intervention, where a user builds code, and takes corrective actions based on the results, which is time-consuming and inefficient.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and computer storage medium for automatically managing and validating a codebase. For example, a build and test validation system may enable code to be built using a tenant model, where large interconnected codebase is sectioned off into smaller pieces called tenants. Validation workflows associated with tenants may be defined in a structured language, such as Extensible Markup Language (XML). The workflows may define tasks for building and validation, such that when a change occurs, only what is necessary for those subsections is built and validated. Further the validation workflows may define actions to take based on the passing or failure of each task, and other customizable properties, such as error escalation settings, build settings, etc. When a build fails, the build and test validation system may auto-classify results of a build and, if applicable, automatically take corrective action based on the classification. In some examples, a corrective action may include automatically routing and escalating an error through various alerts or telecommunications media. In other examples, changes submitted to a failing build may be automatically and intelligently backed out.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
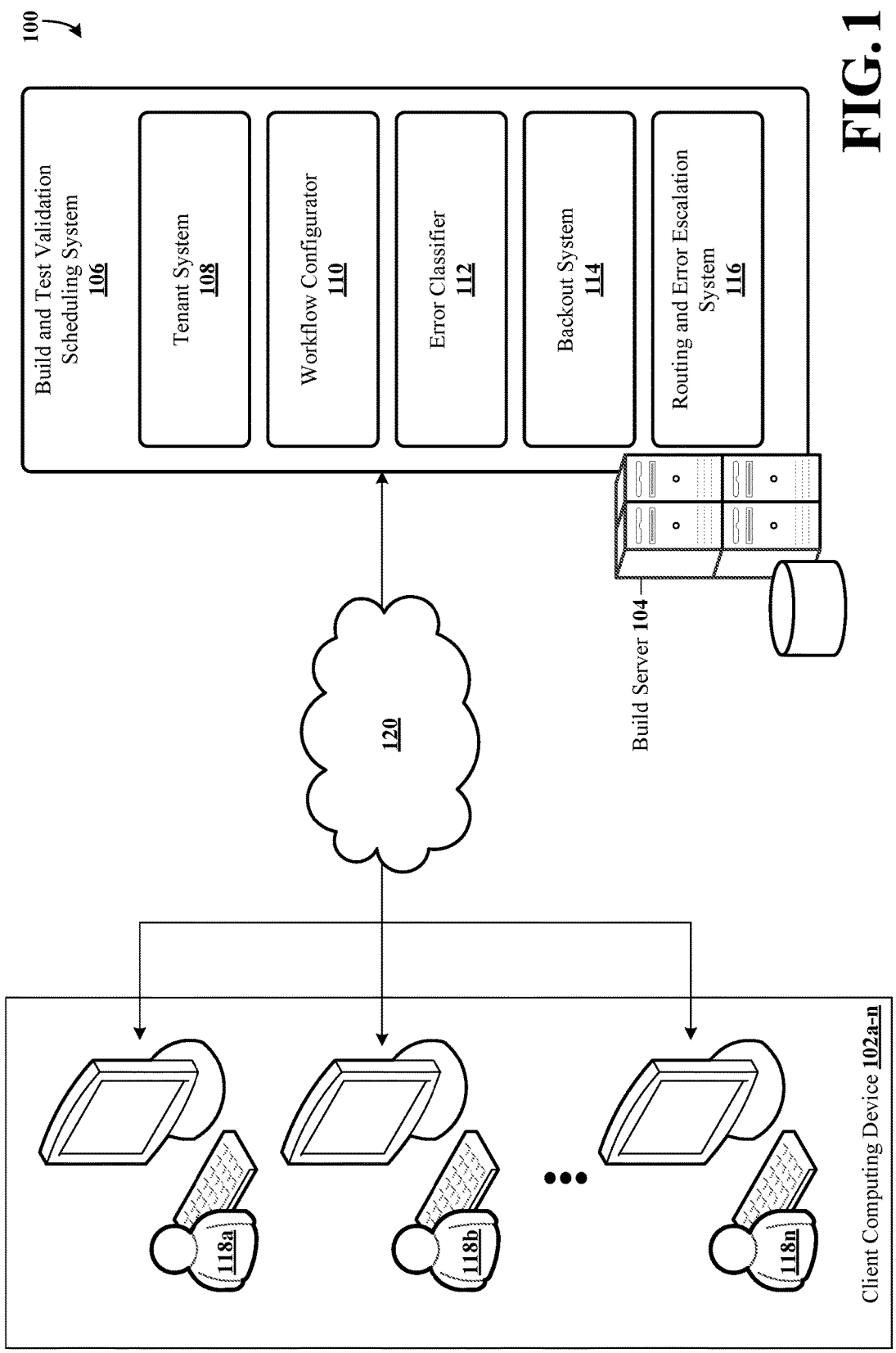
FIG. 1 is a block diagram of an example operating environment comprising a build and test validation scheduling system.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage medium for managing and validating a codebase. With reference now to FIG. 1, an example operating environment 100 including a build and test validation scheduling system 106 is shown. The example operating environment 100 may include one or more client computing devices 102a-n (collectively, 102) via which users 118a-n (collectively, 118) (e.g., software developers) may use to write and edit source code that is used to build a particular software system, application, or software component. Client computing devices 102 can be a variety of machines, including machines running the WINDOWS®, MACOS®, or UNIX® operating systems (offered by Microsoft Corp. of Redmond, Wash.; Apple, Inc.

of Cupertino, Calif.; and The Open Group of Reading, UK; respectively), or represent a computing device in the cloud.

Client computing devices 102 may be operative to communicate over a network 120 with a build server 104. Network 120 may include wired or wireless network. Build server 104 is illustrative of one or more computing devices operative to compile computer source code into binary code, package binary code, and run automated tests. The hardware of these computing devices is discussed in greater detail in regard to FIGS. 9, 10A, 10B, and 11.

Build server 104 may host a build and test validation scheduling system 106. For example, build and test validation scheduling system 106 may be executed on or communicatively connected to the build server 104. According to an aspect, build and test validation scheduling system 106 may include a tenant system 108, a workflow configurator 110, an error classifier 112, a backout system 114, and a routing and error escalation system 116. According to an aspect, backout system 114 and routing and error escalation system 116 may be automatic systems.

Figure 2:
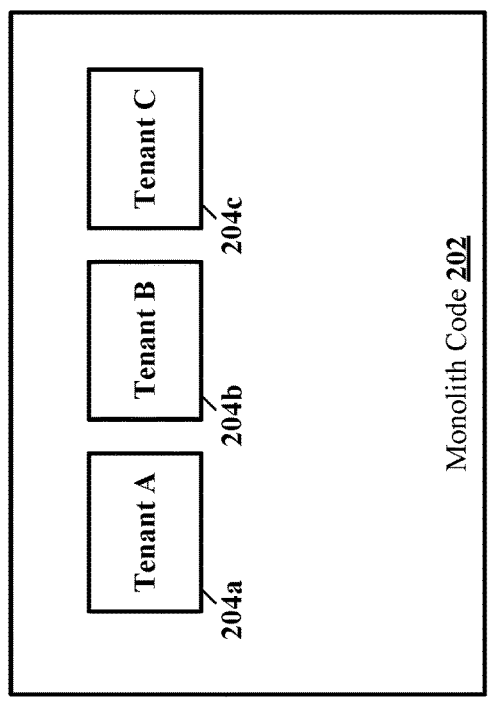
FIG. 2 is a block diagram illustrating a tenant model.
Figure 3:
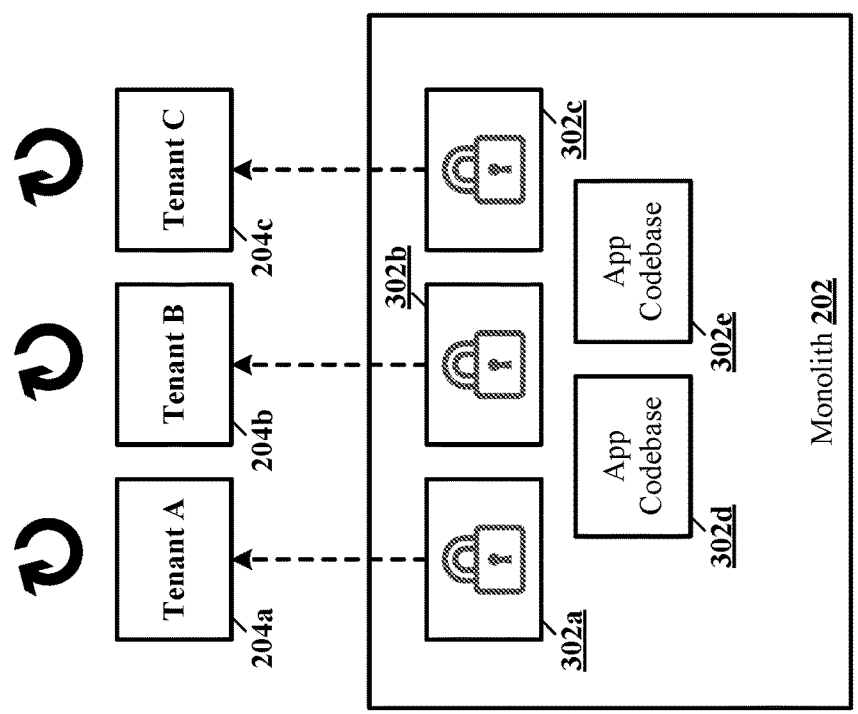
FIG. 3 is a block diagram illustrating a monolithic codebase segregated into a plurality of tenants.

With reference now to FIG. 2, tenant system 108 is illustrative of a software module, system, or device operative to isolate sections of a monolithic codebase 202 for efficient build and validation. For example, and as illustrated in FIG. 2, a monolithic codebase 202 may be segregated into a plurality of smaller sections or tenants 204a-c (collectively, 204) such that check-ins either go inside or outside the tenant, but not both at once. According to aspects, tenants 204 may automatically consume newer binary dependencies when available based on a signal, and may submit its own tenant sources to the main when validated. For example, upstream dependencies may be consumed via forward integration, and changes may be published back to monolithic codebase 202 via reverse integration. In some examples, and as illustrated in FIG. 3, different application codebases 302a-e (collectively, 302) may depend on a single shared library or multiple libraries that they all consume. According to an aspect, in a tenant model environment, different application codebases 302 may continue to take the shared component as an input into the system even though they all build individually and separately. According to an aspect, monolithic codebase 202 may be a single tiered application in which different sections are combined into a single program from a single platform. For example, monolithic codebase 202 may be a software program which is designed without or that uses no usable modularity.

According to an example, in the absence of tenants 204, users 118 may work together in one large branch, and all users get builds on a same cadence. Tenant system 108 may enables users 118 to check-in and verify changes in a shorter time period. For example, if a typical application build in a monolith model environment is on a 36-hour cadence, in a tenant model environment, a turnaround time may include checkpoints every half-hour to three hours with shippable releases every three to four hours. According to an aspect, tenant system 108 may allow development users 118 or teams to ship independently. For example, if one team wants to ship every three years, and another team wants to ship every day, by breaking the monolithic codebase 202 into smaller pieces or tenants 204, the same code may effectively be released at different rates by mirroring and building it separately and then releasing on its own path.

Figure 4:
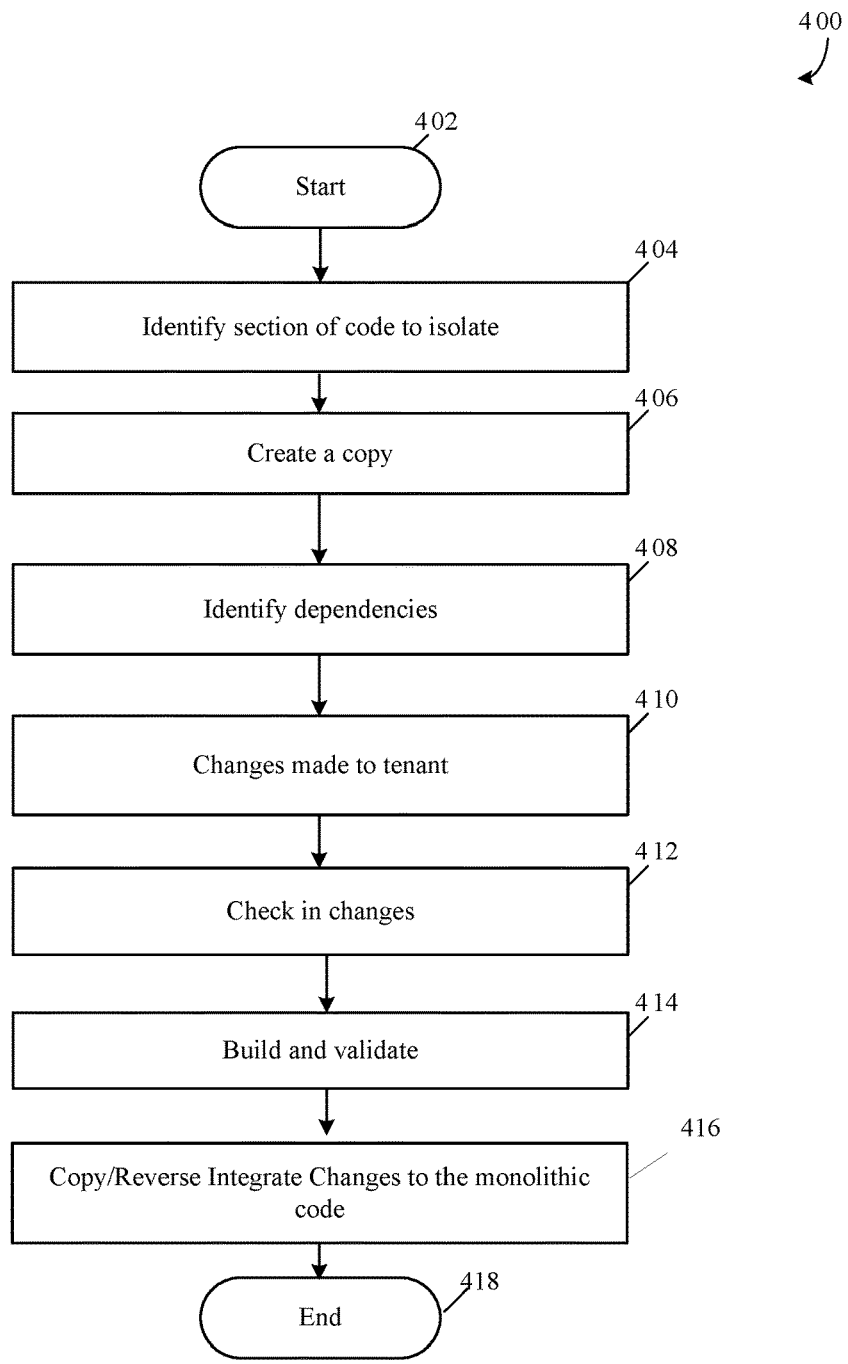
FIG. 4 is a flow chart showing general stages involved in an example method for tenantizing a codebase.

With reference now to FIG. 4, a flowchart showing general stages involved in an example method 400 for tenantizing a monolithic codebase 202 is illustrated. Method 400 starts at OPERATION 402, and may proceed to OPERATION 404 where a section of monolithic codebase 202 to isolate may be identified. After identifying the section of monolithic codebase 202 at OPERATION 404, method 400 may proceed at OPERATION 406 where the identified section of monolithic codebase 202 may be locked in the main branch, a copy of the code may be made, and a tenant 204 may be created. Once tenant 204 is created at OPERATION 406, method 400 may proceed to OPERATION 408 where dependencies may be identified. Once the dependencies are identified at OPERATION 408, method 400 may proceed to OPERATION 410 where changes may be made to tenant 204.

Once changes are made to tenant 204 at OPERATION 410, method 400 may proceed to OPERATION 412 where the changes may be checked in. In some examples, the changes may be checked into a copy made of monolithic codebase 202. After checking in the changes at OPERATION 412, method 400 may proceed to OPERATION 414 where the changes may be built and verified/validated. For example, each time user 118 or team does check-in, tenant 204a may be built, and user 118 may be enabled to find whether the changes pass or fail during the built/verification/validation process. In case of a fail, a defined action may be taken as will be described below. Once the changes are built and verified/validated at OPERATION 414, method 400 may proceed to OPERATION 416 where the changes may be copied or reverse integrated to monolithic codebase 202. After integrating the changes to monolithic codebase 202 at OPERATION 416, method 400 may end at OPERATION 418.

Figure 5:
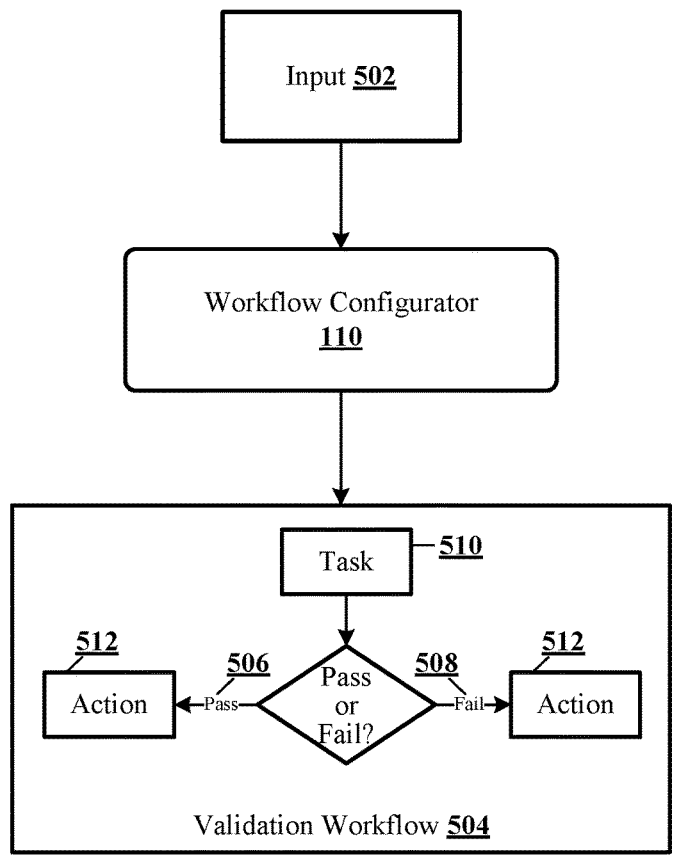
FIG. 5 is a block diagram illustrating a workflow configurator.

With reference now to FIG. 5, workflow configurator 110 is illustrative of a software module, system, or device operative to define validation workflows 504 for tenants 204 according to a structured language for customizing validations. Workflow steps may be run on a schedule or after a checking-in of a tenant 204. For example, when a section of a code is identified and isolated, user 118 may make some changes to the section and check-in tenant 204a back into the code. Workflow steps may be run on such check-in by user 118. For example, a custom workflow may include a success path 506 and a failure path 508 for each task 510 in the workflow 504, wherein success path 506 and failure path 508 may define one or more actions 512 to take based on the passing or failure of the task respectively. Upon a success completion of each step (task 510) in a workflow 504, a checkpoint may be run. For example, a checkpoint is a known good state in the code which allows other users 118 to know that at a given point in time, a section of code has been verified as good and at a point to which users 118 may synchronize the section of code.

In some examples, a custom workflow 504 may define asynchronous actions 512 to take on worker machines (e.g., client computing devices 102) based on pass or fail of long-running actions, such as automation. According to an aspect, for each tenant 204, each user 118 or team may provide various inputs 502 to configure their own structured language files, such as XML (Extensible Markup Language) files, to define actions 512 to take as well as to choose various settings, such as: for what platforms to build, whether the build is a test build or a release build, a size of the build machine on which to perform the build, etc. Further, other inputs 502 for customizing a workflow 504 may include: a list of users 118 or user identifiers identifying developers whose code should not be backed out; certain key words that causes the system to ignore an error and prevents undoing a change (e.g., there may be certain types of changes that are known to be a problem but that should not be undone); a maximum number of changes to back out; etc.

According to an aspect, build and test validation scheduling system 106 may include an automatic error classifier 112, illustrative of a software module, system, or device operative to automatically classify results of a build and if applicable, to automatically take corrective action based on the classification. According to an aspect, automatic error classifier 112 may be operative to interpret specific errors (e.g., internal system issue, external system issue, compiler limitation, product code failure) and take automatic actions to remediate an error. For example, an external system issue may be a failure that is not caused by the product code or build and test validation scheduling system 106. In some examples, based on the error, automatic error classifier 112 may be operative to provide user 118 additional information about the failure that is in a user-readable format (e.g., a cause for the failure, who the user can contact for more information).

Figure 6:
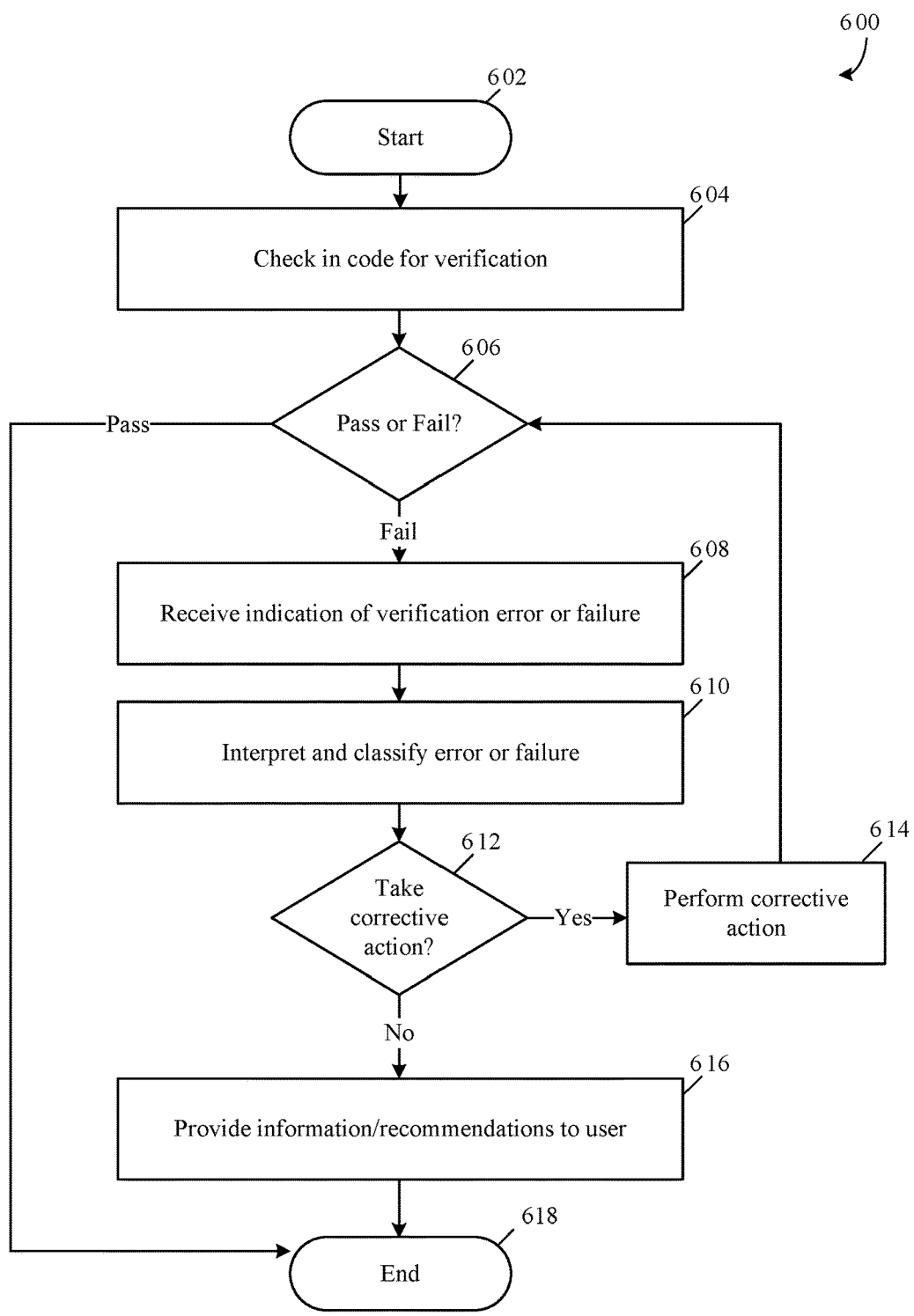
FIG. 6 is a flow chart showing general stages involved in an example method for auto-classifying an error.

With reference now to FIG. 6, a flow chart showing general stages involved in an example method 600 for auto-classifying an error is illustrated. The example method 600 may start at OPERATION 602, and proceed to OPERATION 604 where code may be checked in for running a build for verification. At DECISION OPERATION 606, a determination may be made as to whether the build passes or fails. When a determination is made that the build fails at DECISION OPERATION 606, method 600 may proceed to OPERATION 608 where an indication of the error or failure may be received.

After receiving the indication of the error at OPERATION 608, method 600 may proceed to OPERATION 610 where automatic error classifier 112 may interpret and classify the error or failure. For example, a determination may be made as to whether an error is due to a product issue, the system being in a bad state, a network issue, or because of a known limitation in the compiler. At DECISION OPERATION 612, a determination is made as to whether there is a corrective action that can be automatically performed based on the error failure.

When a determination is made that a corrective action can be performed at DECISION OPERATION 612, and an appropriate corrective action is identified, method 600 may proceed to OPERATION 614 where the corrective action may be performed. For example, if a determination is made that an error is due to the system being in a bad state, automatic error classifier 112 may determine that an appropriate corrective action is to reboot the build machine or re-setup the build machine. As another example, automatic error classifier 112 may determine that an error is due to a known intermittent issue, and determine that an appropriate corrective action may be is to retry the build, which, according to historical data, generally resolves the issue. According to one example, automatic error classifier 112 may not try to retry a build more than once. For example, if a build fails a first time due to a system issue, and it fails a second time due to the same system issue, then automatic error classifier 112 may prevent the system from infinitely retrying.

According to one example, a possible appropriate corrective action may be determined to be an automatic and intelligent routing and escalation of errors. For example, an issue may be communicated to a correct team depending on the error (e.g., system issue versus product issue). In some examples, the routing of an issue may be based on historical data. Consider, for example, that a system issue occurs.

Automatic routing and error escalation system 116 is operative to escalate the issue and route the issue to an appropriate team who can assess the issue and determine whether there may be a wider system and hacking issue. Teams or individuals may be able to configure how they are notified (e.g., email, whether they only want to get that notification when there is a failure, or whether they want to get that notification on every single build, whether they can receive a notification 24 hours a day whenever there is a problem, whether they can get a telephone call). According to an aspect, automatic routing and error escalation system 116 may escalate an issue based on a number of failures. According to another aspect, the automatic routing and error escalation system 116 may escalate an issue based on whether the issue is determined to be a critical issue.

For example, if a build fails, and automatic error classifier 112 may determine that the issue is a system issue (e.g., the network had a hiccup or a server down), the automatic error classifier may determine to try the build again. If it fails again, automatic error classifier 112 may then escalate the issue and contact the appropriate individual or team based on configurations (e.g., notification type, allowable notification times). According to an aspect, the configurations may be defined in the workflow 504.

According to another example, a possible appropriate corrective action may be determined to be an automatic back out of changes submitted to a failing build. Automatic back outs will be described in further detail below. When a corrective action is made, method 600 may return to OPERATION 606, where another build is performed for verification.

When a determination is made that there is not a corrective action that can be automatically performed based on the error failure at DECISION OPERATION 612, method 600 may proceed to OPERATION 616 where additional information or a recommendation may be provided to user 118. For example, if the error or failure is determined to be a product issue, automatic error classifier 112 may notify user 118 and recommend that user 118 investigate and then retry the build. After providing the additional information or the recommendation at OPERATION 616, method 600 may end at OPERATION 618.

In an example aspect, user 118 may validate a set of changes made to the section against multiple tenants 204 of the code. Furthermore, user 118 may check-into all of those multiple tenants 204 individually. In addition, user 118 may be enabled to run a series of validations for the set of changes in an automated fashion before checking the section into the code through pre-check-in workflows. For example, user 118 may create a pre-check-in workflow based on workflow 504.

According to an aspect, build and test validation scheduling system 106 may include an automatic backout system 114 operative to automatically back out of changes submitted to a failing build. For example, automatic backout system 114 may automatically back out of changes in response to a determination to perform a back out as a corrective action by the automatic error classifier 112. In some examples, automatic backout system 114 may be operative to understand previous changes (e.g., changes made in builds previous to a current build) and future changes (e.g., changes made after the current build has started), and to back out logic based on any previous or future changes.

According to an aspect, automatic backout system 114 may be operative to intelligently handle back outs by preventing back outs of back outs. As an example, a first user 118*a* may make a change, check-in the change, and the change may pass validation. A second user 118*b* may decide that the change is not the right change, executes a back out, and the back out fails. According to an aspect, automatic backout system 114 will not back out the back out (e.g., put the change back in even though the back out may have been bad).

Figure 7:
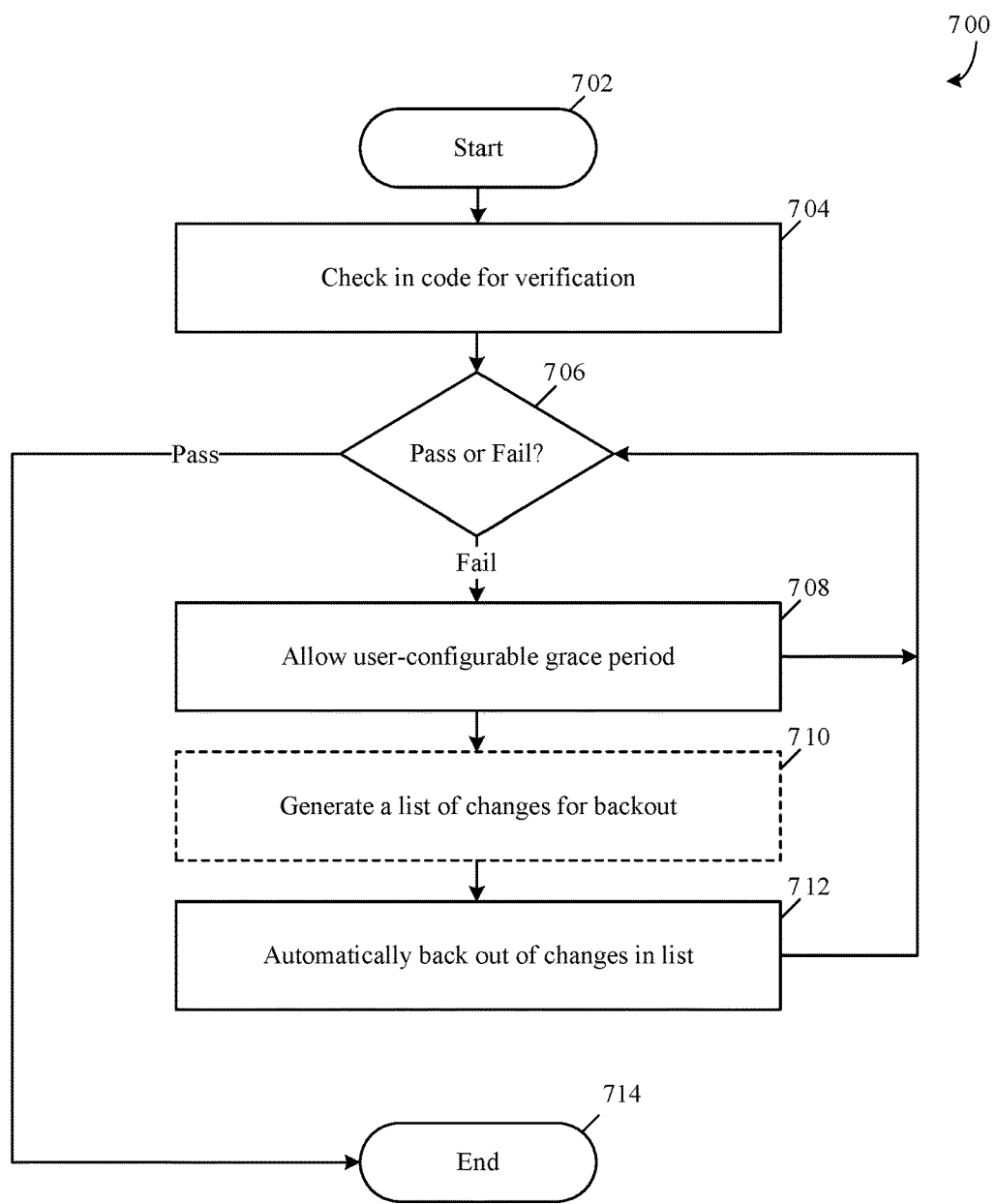
FIG. 7 is a flow chart showing general stages involved in an example method for automatically backing out changes submitted to a failing build.

With reference now to FIG. 7, a flow chart showing general stages involved in an example method 700 for automatically backing out of changes submitted to a failing build is illustrated. The example method 700 may start at OPERATION 702, and proceed to OPERATION 704 where code may be checked in for running a build for verification. Once the code is checked in at OPERATION 704, method 700 may proceed to DECISION OPERATION 706 where a determination may be made as to whether the build passes or fails.

When a determination is made that the build fails at DECISION OPERATION 706, method 700 may proceed to OPERATION 708 where automatic backout system 114 may delay the back out for a predetermined length of time, for example to allow user 118 or team to try to manually remedy the issue. The predetermined length of time may be configurable by user 118. The system may see the back out as a new change, and method 700 may then return to OPERATION 706, where a build is started to verify that the back out was successful.

After allowing a user-configurable grace period at OPERATION 708, method 700 may proceed to optional OPERATION 710 where automatic backout system 114 may generate a list of back out changes. In some examples, automatic backout system 114 may be operative to generate the list of changes that went into previous iterations that may have failed but did not get backed out. For example, a first iteration may build changes 1, 2, and 3, and a second iteration may build changes 4, 5, and 6. If both iterations fail, automatic backout system 114 may add both iterations to the list to back out for the code to be considered to be in a good state. According to an aspect, in some examples, if during the build, another user 118 checks in changes that conflict with current changes in the build, automatic backout system 114 may be operative to consider those changes to be in the set of back outs. In some examples, in OPERATION 712, user 118 may back out a change in another iteration or a change may be automatically backed out in another iteration. Accordingly, automatic backout system 114 may be operative to identify this and not back out the same change again. For example, automatic backout system 114 may abort the build. Method 700 ends at OPERATION 714.

Figure 8:
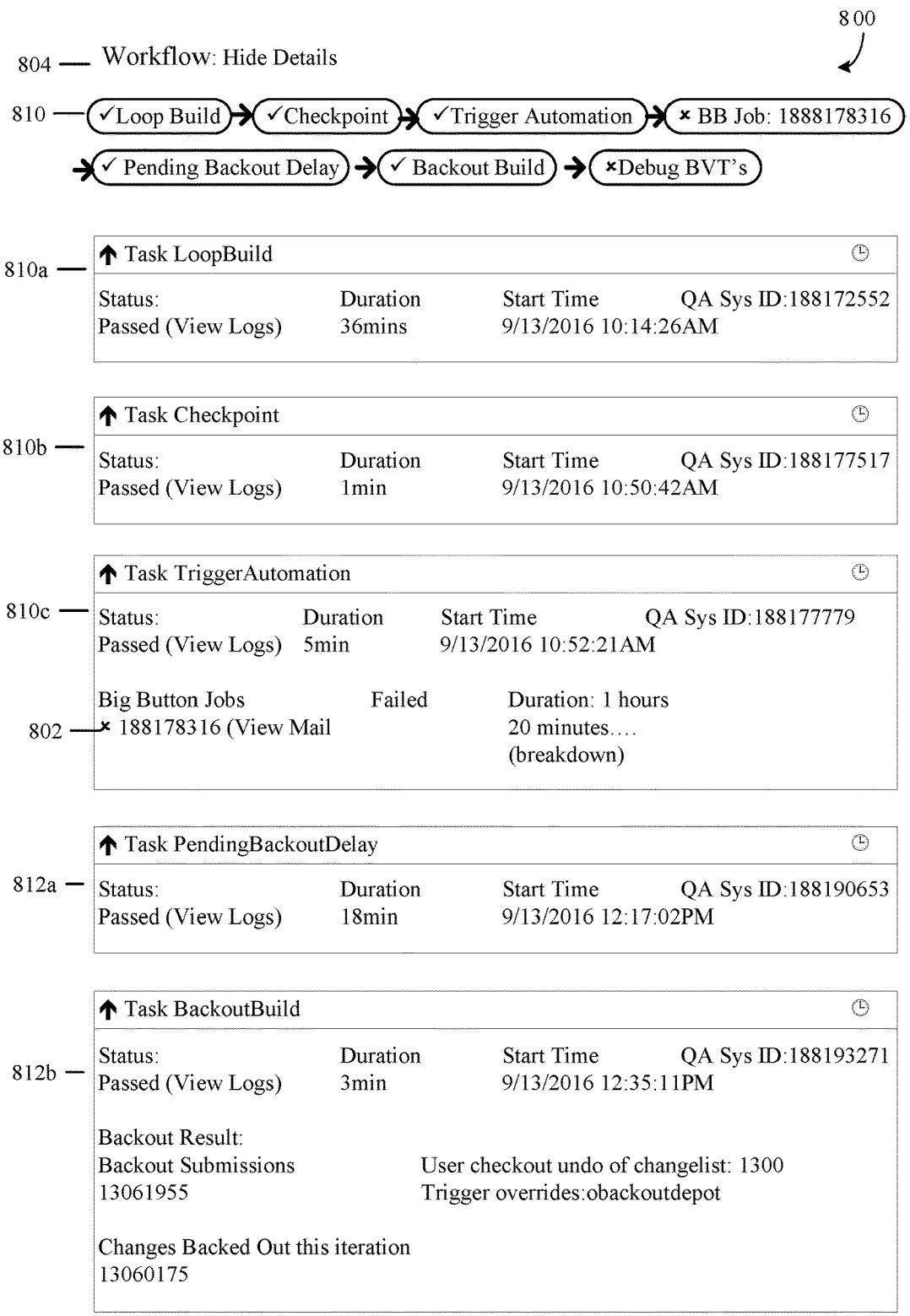
FIG. 8 is an illustration of a portion of an example user interface including a display of steps in an example validation workflow.

With reference now to FIG. 8, an illustration of a portion of an example user interface 800 including a display of steps or tasks 810*a-c* (collectively, 810) in an example validation workflow 804 may be provided. In the illustrated example, the results in user interface 800 may include outcomes of validation workflow 804 (results: passed or failed), start times of executions of validation workflow 804, a duration of execution validation workflow 804, validation workflow 804 logs, etc. In one aspect, results provided in user interface 800 may be configurable, and user 118 may preconfigure results to be shown in user interface 800. In another aspect, additional results of execution of the validation workflow 804 may be provided in logs which may be accessed from one or more links provided in user interface 800. In yet another aspect, user interface 800 may provide a summary or execution results and a detail report of the execution section based on user selection.

In the illustrated example, there are five changes included to the code. For example, a user 118 may have changed a section of the code and checked in the change. As illustrated in FIG. 8, validation workflow 804 may run for each of tasks 810 and provide validation results. For example, for task 510*a*, results may indicate the changes represented by task 810*a* passed validation workflow 810 and may be checked in the code. Similarly, for task 810*b*, results may indicate the changes represented by task 810*b* passed validation workflow 510 and may be check-pointed. However, for task 810*c*, results may indicate that the changes failed the validation test. For example, user interface 800 may illustrate that during the build, there is a failure 802. Validation workflow 804 may be configured to allow for a delay for human intervention (auto-action 812*a*/812*b*). According to aspects, a predetermined grace time period may be provided to allow for automatic or manual intervention to fix an error in response to a determination of a build failure. In the illustrated example, a user 118 may intervene to manually fix error 802.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which implementations are practiced may include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 9:
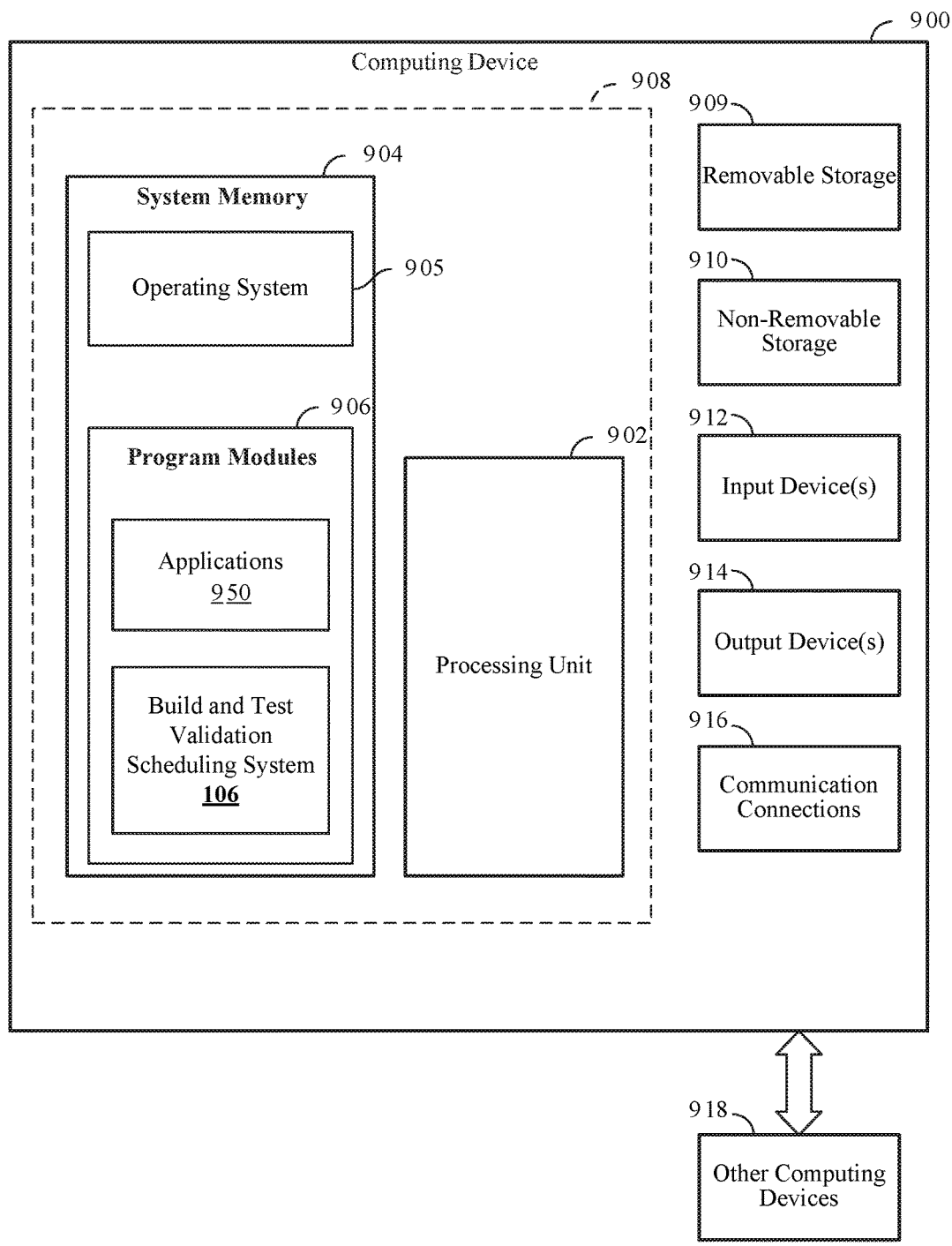
FIG. 9 is a block diagram illustrating example physical components of a computing device.
Figure 10A:
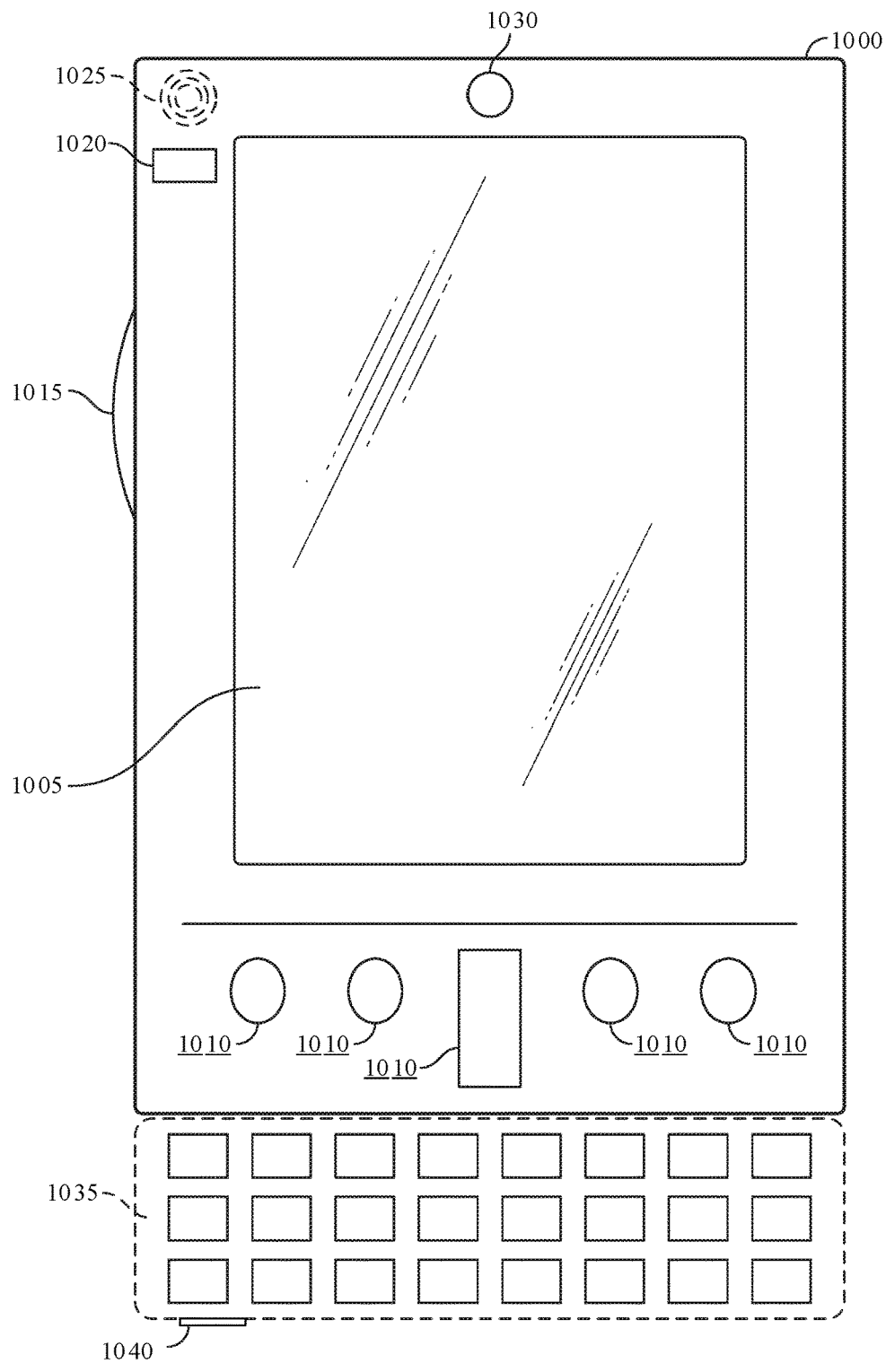
FIGS. 10A and 10B are simplified block diagrams of a mobile computing device.
Figure 10B:
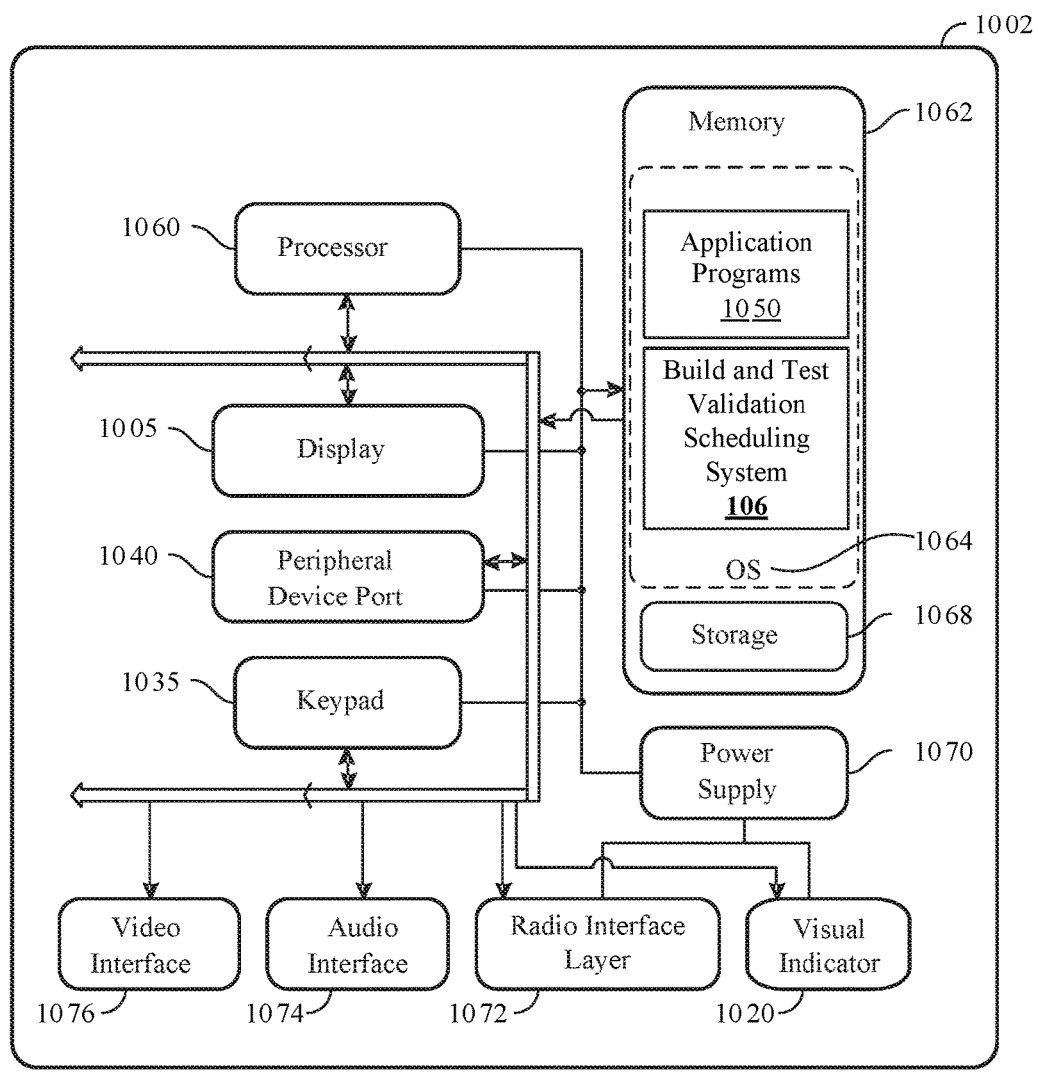
Figure 11:
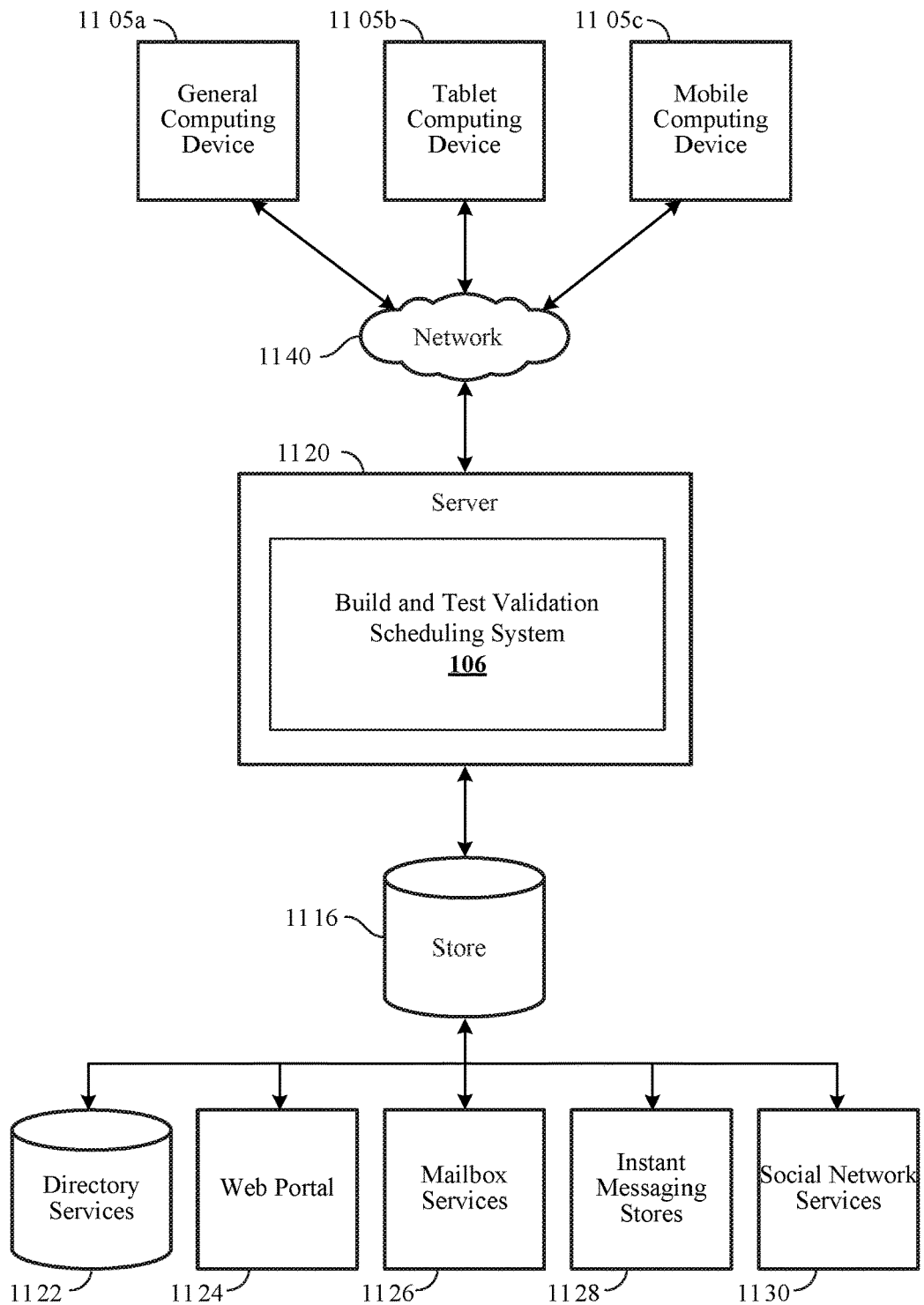
FIG. 11 is a simplified block diagram of a distributed computing system.

FIGS. 9-11 and the associated descriptions provide a discussion of a variety of operating environments in which examples are practiced. However, the devices and systems illustrated and discussed with respect to FIGS. 9-11 are for purposes of example and illustration and are not limiting of a vast number of computing device configurations that are utilized for practicing aspects, described herein.

FIG. 9 is a block diagram illustrating physical components (i.e., hardware) of a computing device 900 with which examples of the present disclosure may be practiced. In a basic configuration, computing device 900 may include at least one processing unit 902 and a system memory 904. According to an aspect, depending on the configuration and type of computing device, system memory 904 may include, but is not limited to, volatile storage (e.g., random access memory), non-volatile storage (e.g., read-only memory), flash memory, or any combination of such memories. According to an aspect, system memory 904 may include an operating system 905 and one or more program modules 906 suitable for running software applications 950. For example, system memory 904 may include build and test validation scheduling system 106. Operating system 905, for example, may be suitable for controlling the operation of computing device 900. Furthermore, aspects may be practiced in conjunction with a graphics library, other operating systems, or any other application program, and is not limited to any particular application or system. This basic configuration is illustrated in FIG. 9 by those components within a dashed line 908. According to an aspect, computing device 900 may include additional features or functionality. For example, according to an aspect, computing device 900 may include additional data storage devices (removable and/or non-removable) such as, for example, magnetic disks, optical disks, or tape. Such additional storage is illustrated in FIG. 9 by a removable storage device 909 and a non-removable storage device 910.

As stated above, according to an aspect, a number of program modules and data files may be stored in the system memory 904. While executing on processing unit 902, program modules 906 (e.g., build and test validation scheduling system 106) may perform processes including, but not limited to, one or more of the stages of the methods 400, 600, 700 illustrated in FIGS. 4, 6, and 7 respectively. According to an aspect, other program modules may be used in accordance with examples and include applications such as electronic mail and contacts applications, word processing applications, spreadsheet applications, database applications, slide presentation applications, drawing or computer-aided application programs, etc.

According to an aspect, aspects may be practiced in an electrical circuit comprising discrete electronic elements, packaged or integrated electronic chips containing logic gates, a circuit utilizing a microprocessor, or on a single chip containing electronic elements or microprocessors. For example, aspects may be practiced via a system-on-a-chip (SOC) where each or many of the components illustrated in FIG. 9 may integrated onto a single integrated circuit. According to an aspect, such an SOC device may include one or more processing units, graphics units, communications units, system virtualization units and various application functionality all of which are integrated (or "burned") onto the chip substrate as a single integrated circuit. When operating via an SOC, the functionality, described herein, may be operated via application-specific logic integrated with other components of computing device 900 on the single integrated circuit (chip). According to an aspect, aspects of the present disclosure may be practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, computing device 900 may include one or more input device(s) 912 such as a keyboard, a mouse, a pen, a sound input device, a touch input device, etc. Output device(s) 914 such as a display, speakers, a printer, etc. may also be included to computing device 900. The aforementioned devices are examples and others may be used. According to an aspect, computing device 900 may include one or more communication connections 916 allowing communications with other computing devices 918. Examples of suitable communication connections 916 may include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. System memory 904, removable storage device 909, and non-removable storage device 910 are all computer storage media examples (i.e., memory storage.) According to an aspect, computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by computing device 900. According to an aspect, any such computer storage media may be part of computing device 900. Computer storage media does not include a carrier wave or other propagated data signal.

According to an aspect, communication media may be embodied by computer readable instructions, data structures, program modules, or other data in a modulated data signal, such as a carrier wave or other transport mechanism, and may include any information delivery media. According to an aspect, the term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10A and 10B illustrate a mobile computing device 1000, for example, a mobile telephone, a smart phone, a tablet personal computer, a laptop computer, and the like, with which aspects may be practiced. With reference to FIG. 10A, an example of a mobile computing device 1000 for implementing the aspects is illustrated. In a basic configuration, mobile computing device 1000 may be a handheld computer having both input elements and output elements. Mobile computing device 1000 may typically include a display 1005 and one or more input buttons 1010 that may allow the user to enter information into mobile computing device 1000. According to an aspect, display 1005 of mobile computing device 1000 may function as an input device (e.g., a touch screen display). If included, an optional side input element 1015 may allows further user input. According to an aspect, side input element 1015 may be a rotary switch, a button, or any other type of manual input element. In alternative examples, mobile computing device 1000 may incorporate more or less input elements. For example, display 1005 may not be a touch screen in some examples. In alternative examples, mobile computing device 1000 may be a portable phone system, such as a cellular phone. According to an aspect, mobile computing device 1000 may include an optional keypad 1035. According to an aspect, optional keypad 1035 may be a physical keypad. According to another aspect, optional keypad 1035 may be a "soft"

keypad generated on the touch screen display. In various aspects, the output elements include display 1005 for showing a graphical user interface (GUI), a visual indicator 1020 (e.g., a light emitting diode), and/or an audio transducer 1025 (e.g., a speaker). In some examples, mobile computing device 1000 may incorporate a vibration transducer for providing the user with tactile feedback. In yet another example, mobile computing device 1000 may incorporate input and/or output ports, such as an audio input (e.g., a microphone jack), an audio output (e.g., a headphone jack), and a video output (e.g., a HDMI port) for sending signals to or receiving signals from an external device. In yet another example, mobile computing device 1000 may incorporate peripheral device port 1040, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one example of a mobile computing device. That is, mobile computing device 1000 may incorporate a system (i.e., an architecture) 1002 to implement some examples. In one example, system 1002 may be implemented as a "smart phone" capable of running one or more applications (e.g., browser, e-mail, calendaring, contact managers, messaging clients, games, and media clients/players). In some examples, system 1002 may be integrated as a computing device, such as an integrated personal digital assistant (PDA) and wireless phone.

According to an aspect, one or more application programs 1050 may be loaded into memory 1062 and may run on or in association with the operating system 1064. Examples of the application programs may include phone dialer programs, e-mail programs, personal information management (PIM) programs, word processing programs, spreadsheet programs, Internet browser programs, messaging programs, and so forth. According to an aspect, build and test validation scheduling system 106 may be loaded into memory 1062. System 1002 may also include a non-volatile storage area 1068 within memory 1062. Non-volatile storage area 1068 may be used to store persistent information that should not be lost if system 1002 is powered down. Application programs 1050 may use and store information in the non-volatile storage area 1068, such as e-mail or other messages used by an e-mail application, and the like. A synchronization application (not shown) may also resides on system 1002 and may be programmed to interact with a corresponding synchronization application resident on a host computer to keep the information stored in non-volatile storage area 1068 synchronized with corresponding information stored at the host computer. As should be appreciated, other applications may be loaded into memory 1062 and run on mobile computing device 1000.

According to an aspect, system 1002 may include a power supply 1070, which may be implemented as one or more batteries. According to an aspect, power supply 1070 may further include an external power source, such as an AC adapter or a powered docking cradle that supplements or recharges the batteries.

According to an aspect, system 1002 may include a radio 1072 that may perform the function of transmitting and receiving radio frequency communications. Radio 1072 may facilitate wireless connectivity between system 1002 and the "outside world," via a communications carrier or service provider. Transmissions to and from radio 1072 may be conducted under control of operating system 1064. In other words, communications received by radio 1072 may be disseminated to the application programs 1050 via operating system 1064, and vice versa.

According to an aspect, visual indicator 1020 may be used to provide visual notifications and/or an audio interface 1074 may be used for producing audible notifications via audio transducer 1025. In the illustrated example, visual indicator 1020 may be a light emitting diode (LED) and audio transducer 1025 may be a speaker. These devices may be directly coupled to power supply 1070 so that when activated, they remain on for a duration dictated by the notification mechanism even though processor 1060 and other components might shut down for conserving battery power. The LED may be programmed to remain on indefinitely until the user takes action to indicate the powered-on status of the device. Audio interface 1074 may be used to provide audible signals to and receive audible signals from the user. For example, in addition to being coupled to audio transducer 1025, audio interface 1074 may also be coupled to a microphone to receive audible input, such as to facilitate a telephone conversation. According to an aspect, system 1002 may further include a video interface 1076 that enables an operation of an on-board camera 1030 to record still images, video stream, and the like.

According to an aspect, a mobile computing device 1000 implementing system 1002 may include additional features or functionality. For example, mobile computing device 1000 may include additional data storage devices (removable and/or non-removable) such as, magnetic disks, optical disks, or tape. Such additional storage is illustrated in FIG. 10B by the non-volatile storage area 1068.

According to an aspect, data/information generated or captured by mobile computing device 1000 and stored via system 1002 may be stored locally on mobile computing device 1000, as described above. According to another aspect, the data is stored on any number of storage media that is accessible by the device via radio 1072 or via a wired connection between mobile computing device 1000 and a separate computing device associated with the mobile computing device 1000, for example, a server computer in a distributed computing network, such as the Internet. As should be appreciated such data/information may be accessible via mobile computing device 1000 via radio 1072 or via a distributed computing network. Similarly, according to an aspect, such data/information may readily be transferred between computing devices for storage and use according to well-known data/information transfer and storage means, including electronic mail and collaborative data/information sharing systems.

FIG. 11 illustrates one example of the architecture of a system for automatically managing and validating a codebase as described above. Content developed, interacted with, or edited in association with the build and test validation scheduling system 106 may be enabled to be stored in different communication channels or other storage types. For example, various documents may be stored using a directory service 1122, a web portal 1124, a mailbox service 1126, an instant messaging store 1128, or a social networking service 1130. Build and test validation scheduling system 106 may be operative to use any of these types of systems or the like for automatically managing and validating a codebase, as described herein. According to an aspect, a server 1120 may provide build and test validation scheduling system 106 to clients 1105a-c (collectively, 1105). As one example, server 1120 may be a web server providing build and test validation scheduling system 106 over the web. Server 1120 may provide build and test validation scheduling system 106 over the web to clients 1105 through a network 1140. By way of example, the client computing device may be implemented and embodied in a personal computer 1105a, a tablet computing device 1105b or a mobile computing device 1105c (e.g., a smart phone), or other computing device. Any of these examples of the client computing device may be operable to obtain content from store 1116.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for managing a monolithic code, the method comprising:
   receiving a request to check-in a first code into a first tenant code of a monolithic code, wherein the first tenant code is one of two or more tenant codes;
   performing, in response to receiving the request to check-in the first code, a first build of the first tenant code on a first build machine;
   performing a validation of the first build;
   providing, based on the validation, a validation result, wherein the validation result is an error;
   based on the validation result is an error, determining that the first build machine is in a bad state; and
   when the first build machine is in a bad state, executing a corrective action, wherein the corrective action is rebooting the first build machine and performing a second build.

2. The method of claim 1, further comprising performing a second validation on the second build.

3. The method of claim 2, further comprising:
   providing, based on the second validation, a second validation result, wherein the second validation result is a second error;
   providing, in response to determining the second validation result is the second error, a predetermined grace time period for a user to intervene; and
   backing out, in response to not receiving a user input during the predetermined grace time period, one or more changes to the first tenant code introduced during the second build.

4. The method of claim 2, further comprising interpreting and classifying the error in the first build of the first tenant code.

5. The method of claim 2, further comprising disabling a loop caused by an error condition in the second build.

6. The method of claim 2, further comprising notifying a user of the first tenant code of the error.

7. The method of claim 1, further comprising:
   providing, in response to determining the validation result is an error and before rebooting the first build machine executing the corrective action, a predetermined grace time period for a user to intervene; and
   performing, in response to receiving an user input during the predetermined grace time period, the second build of the first tenant code.

8. The method of claim 1, further comprising: determining a second error in the second build; and
   backing out, in response to detecting the second error, one or more changes to the first tenant code introduced by the first build.

9. The method of claim 8, further comprising:
   determining at least one change introduced to the first tenant code before the first build;
   backing out, in response to detecting the second error, the one or more changes to the first tenant code introduced by the check-in of the first code; and preserving the at least one change introduced to the first tenant code before the first build.

10. The method of claim 1, further comprising aborting a third build of the first tenant code in response to a request to check-in a second code comprising one or more changes resulting in a second error in the second build.

11. A system for managing a monolithic code, the system comprising: at least one processing device; and at least one computer readable data storage device storing instructions that, when executed by the at least one processing device, are operative to:
   receive a request to check-in a first code into a first tenant of a plurality of tenants of a monolithic code, the first code comprising one or more changes to the first tenant;
   perform, in response to the request to check-in the first code, a first build of a first tenant to incorporate the one or more changes of the first tenant on a first build machine;
   validate the first build;
   provide a result of the first build;
   classify the result of the first build as one of the following: successful, and failure;
   when the result of the first build is failure, determine that a system performing the first build is in a bad state; and
   when the system is in a bad state, automatically execute a corrective action for the failure, wherein the corrective action is
   reboot a first build machine on which the first build was performed and perform a second build, of the first tenant.

12. The system of claim 11, wherein the at least one processing device is further operative to:
   in response to classifying the result of the first build as failure and prior to performing the corrective action, provide a predetermined grace time period for a user to intervene;

perform, in response to receiving an user input during the predetermined grace time period, the corrective action.

13. The system of claim 12, wherein the at least one processing device is further operative to:
   in response to classifying the result of the first build as failure and prior to performing the corrective action, provide a predetermined grace time period for a user to intervene;
   when no user input is received during the predetermined grace time period, back out at least a portion of the first code.

14. The system of claim 12, wherein the at least one processing device is further operative to:
   route, in response to classifying the first build as failure, at least one error in the first build.

15. A computer readable storage device including computer readable instructions, which when executed by a processing unit is operative to:
   segregate a monolithic code into a plurality of sections;
   receive a request to check-in a first code into a first section of the plurality of sections, the first code introducing one or more changes to a first section code;
   perform, in response to the request to check-in the first code, a first build of the first section code to incorporate the one or more changes of the first code on a first build machine;
   validate the first build;
   provide, based on validation of the first build, a result comprising failure of the first build;
   based on the first validation result is failure, determine that the first build machine is in a bad state; and
   when the first build machine is in a bad state, executing a corrective action for the failure, wherein the corrective action comprises: reboot the first build machine and perform a second build.

16. The computer readable storage device of claim 15, further operative to: in response to a determination that the second build does not comprise code that generated the failure of the first build, execute the second build of the first section code.

17. The computer readable storage device of claim 15, further operative to:
   provide, in response to determining the failure of the first build, a predetermined grace time period for a user to intervene;
   perform, in response to receiving an user input during the predetermined grace time period, the second build of the first section code;
   determine whether the second build comprises code that generated the failure of the first build;
   and in response to the determination that the second build comprises code that generated the failure of the first build, automatically aborting the second build of the first section code.

18. The computer readable storage device of claim 17, further operative to:
   back out, in response to not receiving an user input during the predetermined grace time period, the one or more changes to the first section code introduced during the first build.

19. The computer readable storage device of claim 18, further operative to:
   determine at least one change introduced to the first section code before the first build;
   back out, in response to detecting the failure, the one or more changes to the first section code introduced by the check-in of the first code; and
   preserve the at least one change introduced to the first section code before the first build.

* * * * *